United States Patent [19]
Irie

[11] Patent Number: 5,928,675
[45] Date of Patent: *Jul. 27, 1999

[54] GREEN TIRE SUPPLY FACILITY FOR A TIRE VULCANIZING SYSTEM

[75] Inventor: Nobuhiko Irie, Nagasaki, Japan

[73] Assignee: Mitsubishi Jukogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/680,120

[22] Filed: Jul. 15, 1996

[30] Foreign Application Priority Data

Jul. 20, 1995 [JP] Japan ..................................... 7-184235

[51] Int. Cl.$^6$ .................................................. B29C 35/02
[52] U.S. Cl. ........................... 425/34.1; 425/28.1; 425/38
[58] Field of Search ........................... 425/28.1, 29, 34.1, 425/38

[56] References Cited

U.S. PATENT DOCUMENTS

| | | | |
|---|---|---|---|
| 4,268,219 | 5/1981 | Nakagawa et al. | 414/786 |
| 4,578,023 | 3/1986 | Irie | 425/34.1 |
| 4,585,405 | 4/1986 | Capecchi | 425/34.1 |
| 4,773,810 | 9/1988 | Nishimura et al. | 414/331 |
| 4,778,060 | 10/1988 | Wessner, Jr. | 425/29 |
| 4,824,349 | 4/1989 | Oku et al. | 425/29 |
| 4,881,882 | 11/1989 | Fantacci | 425/38 |
| 4,993,906 | 2/1991 | Nisimura et al. | 414/286 |
| 5,631,028 | 5/1997 | Mizokawa et al. | 425/38 |

FOREIGN PATENT DOCUMENTS

| | | |
|---|---|---|
| 0099326 | 1/1984 | European Pat. Off. . |
| 4-148921 | 5/1992 | Japan . |
| 7-80845 | 3/1995 | Japan . |
| 7-80846 | 3/1995 | Japan . |
| 7-100834 | 4/1995 | Japan . |
| 7-227850 | 8/1995 | Japan . |

*Primary Examiner*—James P. Mackey

[57] ABSTRACT

A plurality of green tire storage tables and a green tire loading/unloading apparatus for transferring a green tire on the green tire carrier onto the green tire storage table are provided between a green tire loader at the mold opening/closing station and a plurality of green tire carriers, at least one green tire storage table of the green tire storage tables is a movable green tire storage table, the movable green tire storage table being capable of reciprocating between a first position where a green tire is received by using the green tire loading/unloading apparatus and a second position where a green tire is delivered to the green tire loader, the green tire loading/unloading apparatus can travel between the plural green tire carriers and the plural green tire storage tables, the green tire held horizontally on the movable green tire storage table or by the green tire loading/unloading apparatus is turned so that the positioning control of green tire can be carried out, and the green tire type mark attached to the green tire surface can be read by a green tire type reading device of the movable green tire storage table or a green tire type reading device of the green tire loading/unloading apparatus.

15 Claims, 3 Drawing Sheets

GREEN TIRE SUPPLY FACILITY FOR A TIRE VULCANIZING SYSTEM

FIELD OF THE INVENTION AND RELATED ART STATEMENT

The present invention relates to a green tire supply facility for a tire vulcanizing system.

The applicant of this invention has already proposed a system for vulcanizing a pneumatic tire mounted on an automobile etc. (refer to Japanese Patent Provisional Publication No. 7-80846 (No. 80846/1995).

The outline of this pneumatic tire vulcanizing system will be described below with reference to FIGS. 3 and 4. This tire vulcanizing system comprises vulcanizing stations 1 (1a, 1b) at which a plurality of sets of tire vulcanizing molds M (Ma, Mb, Mc, . . . ) are arranged for vulcanization, mold opening/closing stations 2 (2a, 2b) at which the tire vulcanizing mold M is opened to remove a vulcanized tire, an unvulcanized tire to be vulcanized next is put into the mold for shaping, and the tire vulcanizing mold M is closed, a mold changing station 21 at which a mold or a bladder, which is an expendable, is changed, and mold carriers (mold carrying apparatuses) 3 (3a, 3b) for transferring the tire vulcanizing mold M between the vulcanizing station 1, the mold opening/closing station 2, and the mold changing station 21.

In this tire vulcanizing system, a tire vulcanizing mold M is received by the mold carrier 3 from the vulcanizing station 1, and carried to the mold opening/closing station 2. After the tire vulcanizing mold M carried to the mold opening/closing station 2 is engaged with a mold opening/closing apparatus 6, the tire vulcanizing mold M is opened by the action of the mold opening/closing apparatus 6, and carried out by an unloader attached to the mold opening/closing apparatus 6. Then, an unvulcanized tire to be vulcanized next is loaded into the tire vulcanizing mold M, from which the vulcanized tire has been unloaded, by a loader attached to the mold opening/closing apparatus 6, and the shaping of the tire is effected in the closing process of the tire vulcanizing mold M. After the tire vulcanizing mold M is closed, a heating/pressurizing medium is introduced and enclosed in the inside of tire, thereby the tire vulcanizing process being started.

Then, the tire vulcanizing mold M, in which vulcanization has been started, is disengaged from the mold opening/closing apparatus 6, and put again onto the mold carrier 3 so as to be returned to the vulcanizing station 1.

The tire vulcanizing system shown in FIGS. 3 and 4 requires the following facilities and work:

(1) The aforementioned tire vulcanizing system produces tires by using a plurality of tire vulcanizing molds M, so that a plurality of types of green tires are supplied. Therefore, a green tire suitable for the tire vulcanizing mold M carried to the tire opening/closing station 2 must be prepared and supplied without delay.

(2) The green tire supplied to the tire vulcanizing system is carried from a tire assembling machine etc. in the upstream process by means of a green tire carrier. Therefore, the green tire supply facility, which receives the green tire from the green tire carrier, must be suitable for the carrying system of the green tire carrier.

(3) The green tire on the green tire carrier is unloaded by manpower as necessary by the operator of the vulcanizing machine. The unloading work from the green tire carrier must be made automatic.

(4) When the green tire is transferred to a green tire storage table in front of the tire vulcanizing machine, the operator puts the green tire on the green tire storage table. At this time, to coincide the specified position of green tire with the specified position of the green tire storage table, the green tire is put on the green tire storage table after the mutual positions are checked. This positioning control must be made automatic.

(5) When the green tire supply facility for receiving the green tire from the green tire carrier is made automatic, it must be checked beforehand whether the type of green tire supplied automatically is correct.

OBJECT AND SUMMARY OF THE INVENTION

The present invention was made in view of the above problems, and an object thereof is to provide a green tire supply facility for a tire vulcanizing system, in which ① the supply of a green tire from a green tire carrier to the tire vulcanizing system and the positioning control of the green tire can be performed automatically, ② the freedom of time can be increased significantly, ③ the occupied space and the facility cost can be reduced, ④ the existing green tire carrier can be used as it is, and ⑤ it can be checked beforehand whether the automatically supplied green tire is correct.

To achieve the above object, the present invention provides a green tire supply facility for a tire vulcanizing system having a vulcanizing station 1 at which a plurality of sets of tire vulcanizing molds M are arranged for vulcanization, and a mold opening/closing station 2 at which the tire vulcanizing mold M is opened to remove a vulcanized tire, an unvulcanized tire to be vulcanized next is put into the mold for shaping, and the tire vulcanizing mold M is closed, wherein a plurality of green tire storage tables A and a green tire loading/unloading apparatus 11 for transferring a green tire on the green tire carrier C onto the green tire storage table A are provided between a green tire loader 7 at the mold opening/closing station 2 and a plurality of green tire carriers C.

In the green tire supply facility for a tire vulcanizing system, at least one green tire storage table of the green tire storage tables A is a movable green tire storage table B, the movable green tire storage table B being capable of reciprocating between a first position $P_1$ where a green tire is received by using the green tire loading/unloading apparatus 11 and a second position $P_2$ where a green tire is delivered to the green tire loader 7.

In the green tire supply facility for a tire vulcanizing system, positioning control is carried out before the green tire held horizontally on the movable green tire storage table B is turned and delivered to the green tire loader 7.

In the green tire supply facility for a tire vulcanizing system, the movable green tire storage table B is provided with a green tire type reading device 13a for reading the green tire type mark attached to the green tire surface.

In the green tire supply facility for a tire vulcanizing system, the green tire loading/unloading apparatus 11 can travel between the plural green tire carriers C and the plural green tire storage tables A.

In the green tire supply facility for a tire vulcanizing system, the green tire loading/unloading apparatus 11 is provided with a green tire type reading device 11c for reading the green tire type mark attached to the green tire surface.

In the green tire supply facility for a tire vulcanizing system in accordance with the present invention, as described above, (1) the green tire carriers C are parked at a predetermined place near the tire vulcanizing system. Also, the green tire loading/unloading apparatus 11 transfers a green tire T on each green tire carrier C to the green tire storage table A in front of the carrier C, and stores the type of the transferred tire T. (2) A tire vulcanizing mold M in which vulcanization is completed at the vulcanizing station 1 is carried to the mold opening/closing station 2 by using the mold carrier 3. When the end of vulcanization is near at hand, a signal for calling to a predetermined position is generated from the vulcanizing station 1 to the mold carrier 3, and a signal indicative of the type of green tire T needed next is generated from the vulcanizing station 1 to the green tire supply facility 10. (3) While the tire vulcanizing mold M is carried and a vulcanized tire is removed from the tire vulcanizing mold M at the mold opening/closing station 2, the green tire loading/unloading apparatus 11 in the green tire supply facility 10 holds the green tire T on the green tire storage table A and transfers it to the movable green tire storage table B. On the movable green tire storage table B, the green tire T is turned for correct positioning. After the green tire T is stopped, the type of the green tire T is finally checked by the green tire type reading device 13a. (4) After checking, the movable green tire storage table B is moved to the second position $P_2$ where the green tire is delivered to the green tire loader 7 at the mold opening/closing station 2, and stopped there. After stopping, the green tire T is held and lifted by the green tire loader 7 at the mold opening/closing station 2, waiting until the vulcanized tire is carried out at the mold opening/closing station 2, and carried into the tire vulcanizing mold M at a predetermined time. (5) The green tire storage table B from which the green tire is delivered to the green tire loader 7 at the mold opening/closing station 2 is returned to the original first position $P_1$. (6) The green tire loading/unloading apparatus 11 unloads a green tire onto the green tire storage table A which is empty after the transferring in item (3), and transfers the green tire T to the movable green tire storage table B in accordance with the signal from the vulcanizing station 1. (7) Subsequently, the green tire loading/unloading work from the green tire carrier C to the green tire storage table A, the green tire transferring work from the green tire storage table A to the movable green tire storage table B, and the green tire delivering work from the mold opening/closing station 2 to the green tire supply facility 10 are performed in the same way. Therefore, (a) For example, in the case of a tire for a truck or bus, a green tire, which is as heavy as about 80 kg, can be supplied automatically without using manpower from the green tire carrier to the tire vulcanizing system, and the positioning control can also be carried out automatically.

(b) In the case of a tire for a truck or bus, the vulcanization time is about 45 minutes on an average. Even if each tire vulcanizing mold M is for a tire of a different type, the green tire storage tables A as many as the molds M used for vulcanization are provided, by which, after a green tire T for a particular tire vulcanizing mold M, for example, the tire vulcanizing mold Ma is delivered to the movable green tire storage table B, the next green tire T for the tire vulcanizing mold Ma is transferred from the green tire storage table A to the movable green tire storage table B. Therefore, a green tire for the tire vulcanizing mold Ma has only to be carried by the green tire carrier C and delivered to the movable green tire storage table B in about 70 to 80 minutes, that is, within the time period for approximately two cycles of vulcanization, taking the time period for loading/ unloading into consideration, so that the freedom of time can be increased significantly.

(c) The occupied space can be decreased, and the facility cost can be reduced as compared with the conventional green tire supply facility in which the necessary number of green tire carriers are caused to wait near the green tire supply facility, that is, the mold opening/ closing station so that a green tire is taken out as necessary and supplied to the mold opening/closing station.

(d) The existing green tire carrier C can be used as it is.

(e) It can be checked beforehand whether the automatically supplied green tire T is correct.

DETAILED DESCRIPTION OF PREFERRED EMBODIMENTS

One embodiment of a green tire supply facility for a tire vulcanizing system in accordance with the present invention will be described with reference to FIGS. 1 and 2.

Figure 1:
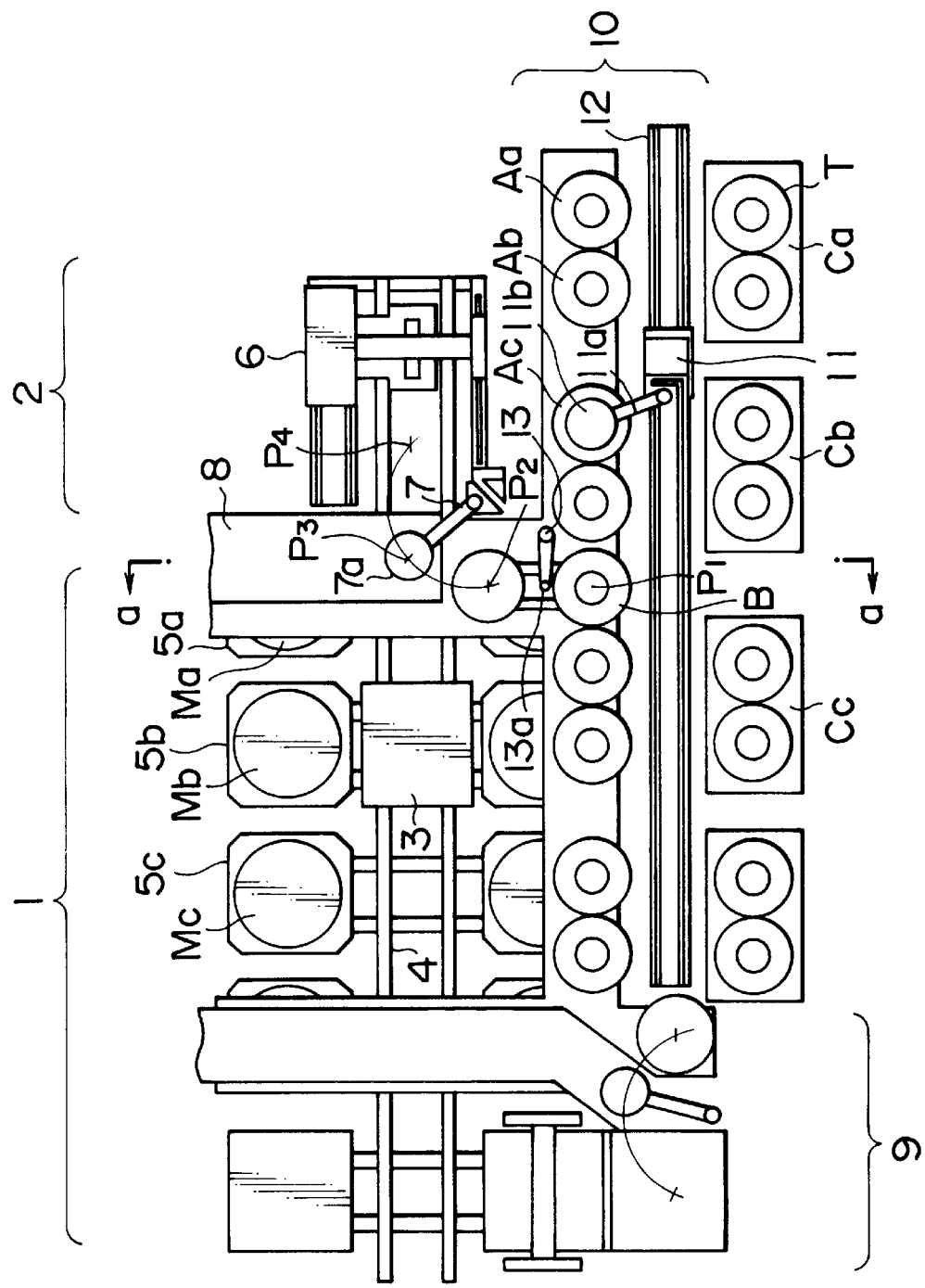
FIG. 1 is a plan view showing one embodiment of a green tire supply facility for a tire vulcanizing system in accordance with the present invention.
Figure 2:
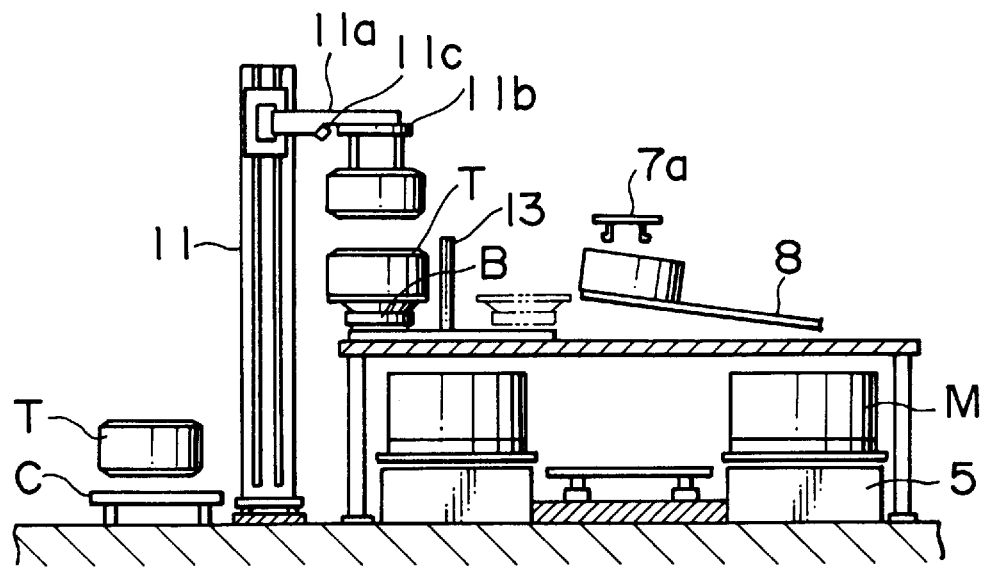
FIG. 2 is a sectional side view taken along the line a—a of FIG. 1.
Figure 4:
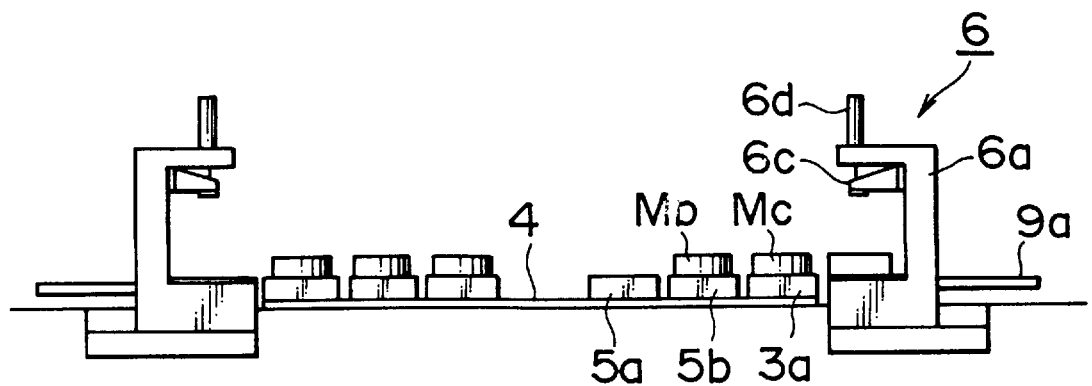
FIG. 4 is a sectional front view taken along the line d—d of FIG. 3.
Figure 3:
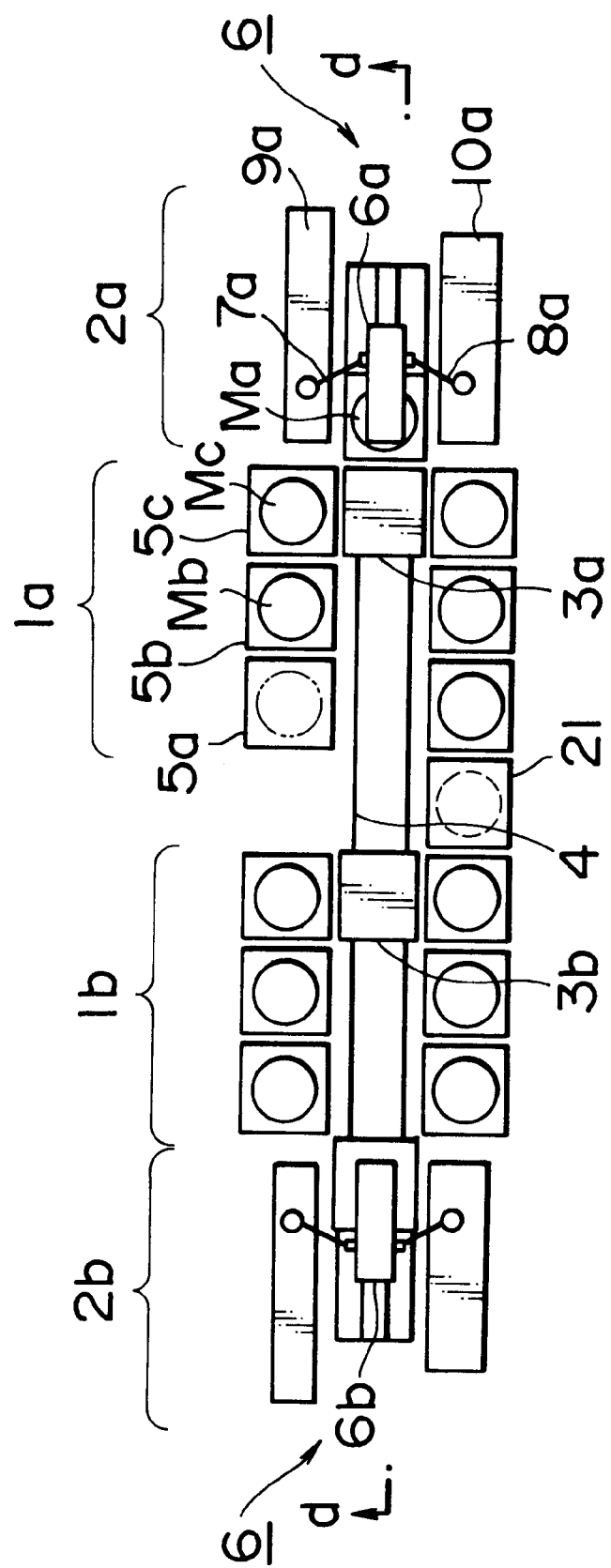
FIG. 3 is a plan view showing a conventional green tire supply facility for a tire vulcanizing system.

FIG. 1 is a plan view of the green tire supply facility for a tire vulcanizing system, a part thereof being omitted. FIG. 2 is a sectional side view taken along the line a—a of FIG. 1.

Reference numeral 1 denotes a vulcanizing station consisting of a plurality of mold tables 5 (5a, 5b, 5c, ...) for mounting a plurality of tire vulcanizing molds M (Ma, Mb, Mc, ...). Each mold table 5 is provided with mold transfer means (for example, a cylinder-driven pusher), not shown, and further with heating/pressurizing medium replenishing means, piping and so on as necessary.

A mold opening/closing station 2 includes a mold opening/closing apparatus 6 which performs opening/ closing of a mold and other operations, a green tire loader 7 which removes a vulcanized tire from the opened mold and loads a green tire to be vulcanized next into the mold, and a conveyor 8 for sending the removed vulcanized tire to the outside of the system.

A mold changing station 9 includes a mold changing table on which the change of tread mold, sidewall mold, etc. in the tire vulcanizing mold M is made according to the change of specifications of the tire being vulcanized and also the change of a bladder, which is an expendable, etc. is made, a mold opening/closing apparatus necessary for these change operations, a lifting apparatus and so on.

A mold carrier 3 travels using driving means, not shown, while being guided by rails 4 fixed to the floor to carry the mold between the vulcanizing station 1, the mold opening/ closing station 2, and the mold changing station 9.

The green tire supply facility 10, which includes a green tire loading/unloading apparatus 11 and a plurality of green tire storage tables A and a movable green tire storage table B, does not travel. What does travel is the green tire loading/unloading apparatus 11.

The green tire supply facility 10 includes a green tire loading/unloading apparatus 11 having an arm 11a which rises/lowers and swings and a green tire holding device 11b provided at the tip end of the arm 11a, a plurality of green tire storage tables A (Aa, Ab, Ac, . . . ) disposed along the rail 12, and a movable green tire storage table B.

The movable green tire storage table B can move between a first position $P_1$ (a position where a green tire T is received using the green tire loading/unloading apparatus 11 driven by the driving means, not shown) and a second position $P_2$ (a position where the green tire T is delivered to the green tire loader 7) and can turn the received green tire T.

The swing arm 11a of the green tire loading/unloading apparatus 11 is provided a sensor 11c for reading a green tire type mark (for example, a bar code label) attached to the green tire T, and a sensor (a green tire type reading device) 13a is attached to the tip end of a sway arm 13 of the movable green tire storage table B to read a green tire type mark (for example, a bar code label) attached to the green tire T.

When the sensor 11c is attached to the green tire loading/unloading apparatus 11, the sensor 13a and the sway arm 13 of the movable green tire storage table B can be omitted. Also, in place of the capability of the movable green tire storage table B to turn the green tire T, the green tire holding device 11b of the green tire loading/unloading apparatus 11 can be configured so as to turn.

On the opposite side of the green tire storage tables A and B with respect to the rails 12, a parking space for a plurality of green tire carriers C (Ca, Cb, Cc, . . . ) mounting a plurality of green tires T is provided.

Next, the operation of the green tire supply facility for a tire vulcanizing system shown in FIGS. 1 and 2 will be described in detail.

When the tire in one tire vulcanizing mold M (for example, Ma) approaches the end of vulcanization at the vulcanizing station 1, a signal indicative of the type of green tire needed next is generated from the vulcanizing station 1 to the green tire supply apparatus 10. When vulcanization is completed in the tire vulcanizing mold Ma, the tire vulcanizing mold Ma is carried to a predetermined position $P_4$ at the mold opening/closing station 2 by means of the mold carrier 3. Then, the mold opening/closing apparatus 6 is operated by a publicly known procedure to open the tire vulcanizing mold Ma, and the vulcanized tire is removed by using the green tire loader 7. The removed vulcanized tire is discharged to a discharge position $P_3$ and sent to the outside of the tire vulcanizing system by using the conveyor 8.

During this time, a green tire T of the type specified by the aforementioned signal is mounted on the movable green tire storage table B, which is waiting in an empty state, at the first position $P_1$ by using the green tire loading/unloading apparatus 11.

After the green tire T is mounted on the movable green tire storage table B, the green tire T is turned, and the sway arm 13 of the type reading device 13a is swayed. Then, the green tire type mark attached to the tire surface in the upstream process is read to make a final check for the green tire type, and the green tire is stopped so that the position of tire is in a predetermined direction. Then, the green tire T is moved to the second position $P_2$ for waiting.

In this embodiment, a bar code label indicative of the green tire type is affixed to a position subjected to positioning control near the upper surface bead of green tire in the upstream process, by which the type of the green tire T is identified by the sensor 13a (bar code reader) of the type reading device, and the positioning control (specification of turning stop of green tire) is carried out.

After the vulcanized tire is discharged to the discharge position $P_3$ by the green tire loader 7, a holding device 7a of the green tire loader 7 is swayed, and lifts the green tire T on the movable green tire storage table B, waiting at the second position $P_2$, by holding the same. Then, the holding device 7a of the green tire loader 7 is swayed in the reverse direction to carry the lifted green tire T in the mold Ma located at the predetermined position $P_4$ at the mold opening/closing station 2. The movable green tire storage table B is returned to the first position $P_1$ for waiting.

After the loading of green tire T is completed and the green tire loader 7 is moved to the discharge (waiting) position $P_3$, shaping of green tire is effected by a publicly known procedure in the mold opening/closing apparatus 6. After the tire vulcanizing mold Ma has been closed, a heating/pressurizing medium is poured into the tire, thereby the vulcanizing process being started. The tire vulcanizing mold M in which the vulcanizing process has been started is transferred to a predetermined position at the vulcanizing station 1, where the vulcanizing process is continued.

On the other hand, in the green tire supply facility 10, ① the tire T needed next is transferred to the movable green tire storage B, ② a green tire is transferred from the carrier to an empty green tire storage table A, and ③ the carrier from which all green tires T are consumed is carried away, and the green tire carrier C loaded with green tires T is parked at a predetermined position. Afterwards, the green tire loading/unloading apparatus 11 is moved to hold and lift the green tire T on the green tire carrier C, and the green tire type mark is read by the sensor 11c (bar code reader in this embodiment).

In place of the installation of the bar code reader as a sensor, a magnetic card reader may be provided so that the data on a magnetic card (a magnetic card on which the tire type data is recorded) carried together with the green tire T by the green tire carrier C is inputted by the operator. Alternatively, the data can be inputted in the upstream process when the green tire carrier C is sent from the upstream process.

If the green tire T lifted by the green tire loading/unloading apparatus 11 happens to be the green tire needed next, the tire T is lowered onto the waiting empty green tire storage table A. If it is not the green tire needed next, the tire T is lowered onto the nearest empty green tire storage table A, the green tire storage condition and the type of the stored tire on each green tire storage table A are automatically stored in a controller, and the green tire can be transferred from the green tire storage table A to the movable green tire storage table B according to the signal from the vulcanizing station 1.

In this embodiment, transfer is effected with priority over the unloading from the carrier.

I claim:

1. A green tire supply facility for a tire vulcanizing system comprising:
   a vulcanizing station at which a plurality of sets of tire vulcanizing molds are arranged for vulcanizing,
   a mold opening/closing station at which said tire vulcanizing molds are opened to remove a vulcanized tire from each mold and, an unvulcanized tire to be vulcanized is put into said each mold for shaping,
   green tire carriers for carrying green tires,
   a plurality of green tire storage tables at least two of the tables fixed so that they do not travel, said at least two of the tables fixed are located next to the green tire carriers a green tire loader located at said mold opening/closing station, and a green tire loading/unloading apparatus for transferring green tires located on said green tire carriers to said green tire storage tables, wherein said green tire carriers are located next to said green tire loading/unloading apparatus which is located between said green tire loader and said green tire carriers.

2. The green tire supply facility for a tire vulcanizing system according to claim 1, wherein at least one green tire storage table of said green tire storage tables is a movable green tire storage table located next to one of the fixed storage tables, means for reciprocating said movable green tire storage table between a first position where a green tire is received by using said green tire loading/unloading apparatus and a second position where a green tire is delivered to said green tire loader.

3. The green tire supply facility for a tire vulcanizing system according to claim 2, further comprising:

means for positioning and controlling a green tire, so that a green tire may be adjusted in a mold in the circumferential direction so that the green tire can be moved to fix the circumferential seam of a tread to a front side of the mold.

4. The green tire supply facility for a tire vulcanizing system according to claim 2, wherein said movable green tire storage table is provided with a green tire type reading device for reading a green tire type mark attached to a green tire surface.

5. The green tire supply facility for a tire vulcanizing system according to claim 1, wherein said green tire loading/unloading apparatus can travel between said green tire carriers and said green tire storage tables.

6. The green tire supply facility for a tire vulcanizing system according to claim 1, wherein said green tire loading/unloading apparatus is provided with a green tire type reading device structurally positioned for reading a green tire type mark attached to a green tire surface.

7. The green tire supply facility for a tire apparatus according to claim 1, wherein the green tire loading/unloading apparatus includes a swing arm.

8. The green tire supply facility for a tire apparatus according to claim 7, wherein the swing arm includes a sensor for reading a green tire mark.

9. The green tire facility for a tire vulcanizing system according to claim 2 wherein the movable tire storage table includes a sway arm.

10. The green tire facility for a tire vulcanizing system according to claim 9, wherein the sway arm includes a sensor.

11. The green tire facility for a tire vulcanizing system according to claim 1, wherein at least some of the molds are effective to process green tires of different types.

12. The green tire facility for a tire vulcanizing system according to claim 11, wherein the loader includes means for delivering an appropriate type of green tire to an appropriate mold of said plurality of said vulcanizing molds.

13. A green tire supply facility for a tire vulcanizing system comprising:

a vulcanizing station at which a plurality of sets of tire vulcanizing molds are arranged for vulcanizing, a mold opening/closing station at which said tire vulcanizing molds are opened to remove a vulcanized tire from each mold and, an unvulcanized tire to be vulcanized is put into said each mold for shaping, a green tire loader located at said mold opening/closing station, green tire carriers for carrying green tires, a plurality of green tire storage tables located next to said green tire carriers at least two of the tables fixed so that they do not travel, at least one of said green tire storage tables is movable and located next to at least one of said fixed tables a green tire loading/unloading apparatus for transferring green tires located on said green tire carriers to said green tire storage tables, wherein said green tire carriers are located next to said green tire loading/unloading apparatus which is located between said green tire loader and said green tire carriers.

14. The green tire supply facility for a tire vulcanizing system according to claim 13, wherein at least one green tire storage table of said green tire storage tables is a movable green tire storage table located next to one of the fixed storage tables, means for reciprocating said movable green tire storage table between a first position where a green tire is received by using said green tire loading/unloading apparatus and a second position where a green tire is delivered to said green tire loader.

15. The green tire supply facility for a tire vulcanizing system according to claim 13, wherein each storage table includes means for holding only one green tire at a time.

* * * * *